US012739145B2

(12) United States Patent
Zhang et al.

(10) Patent No.: US 12,739,145 B2
(45) Date of Patent: Sep. 15, 2026

(54) ASYNCHRONOUS BLOCKCHAIN CONSENSUS METHOD AND SYSTEM WITH DECOUPLED DATA BROADCAST AND CONSENSUS, ELECTRONIC DEVICE AND STORAGE MEDIUM

(71) Applicant: INSTITUTE OF SOFTWARE, CHINESE ACADEMY OF SCIENCES, Beijing (CN)

(72) Inventors: Zhenfeng Zhang, Beijing (CN); Yuan Lu, Beijing (CN); Hao Cheng, Beijing (CN); Yingzi Gao, Beijing (CN); Zhenliang Lu, Beijing (CN); Qiang Tang, Beijing (CN); Jing Xu, Haidian District (CN)

(73) Assignee: INSTITUTE OF SOFTWARE, CHINESE ACADEMY OF SCIENCES, Beijing (CN)

( * ) Notice: Subject to any disclaimer, the term of this patent is extended or adjusted under 35 U.S.C. 154(b) by 105 days.

(21) Appl. No.: 18/845,965

(22) PCT Filed: Mar. 9, 2023

(86) PCT No.: PCT/CN2023/080405
§ 371 (c)(1),
(2) Date: Sep. 11, 2024

(87) PCT Pub. No.: WO2023/174142
PCT Pub. Date: Sep. 21, 2023

(65) Prior Publication Data

US 2025/0193037 A1 Jun. 12, 2025

(30) Foreign Application Priority Data

Mar. 14, 2022 (CN) ........................ 202210247787.6

(51) Int. Cl.
*H04L 12/18* (2006.01)
*H04L 9/40* (2022.01)
(Continued)

(52) U.S. Cl.
CPC ........ *H04L 12/1845* (2013.01); *H04L 63/123* (2013.01); *G06Q 20/3825* (2013.01);
(Continued)

(58) Field of Classification Search
CPC ............ G06Q 20/3825; G06Q 20/3829; H04L 9/085; H04L 9/3255; H04L 9/50; H04L 12/1845; H04L 12/1854; H04L 63/123
See application file for complete search history.

(56) References Cited

U.S. PATENT DOCUMENTS 10,771,259 B2 * 9/2020 Lin ..................... G06F 11/0709
12,099,997 B1 * 9/2024 Hoffberg ............. G06Q 20/065
(Continued)

FOREIGN PATENT DOCUMENTS

CN 108648078 A 10/2018
CN 108667811 A 10/2018
(Continued)

OTHER PUBLICATIONS

"Dumbo-MVBA: Optimal Multi-Valued Validated Asynchronous Byzantine Agreement, Revisited"—Lu et al., JDD-NJIT-ISCAS Joint Blockchain Lab, PODC '20, Aug. 7, 2020 https://dl.acm.org/doi/pdf/10.1145/3382734.3405707 (Year: 2020).*
(Continued)

*Primary Examiner* — Randy A Scott
(74) *Attorney, Agent, or Firm* — Dilworth & Barrese, LLP.; Michael J. Musella, Esq.

(57) ABSTRACT

Disclosed in the present invention are an asynchronous blockchain consensus method and system with decoupled
(Continued)

data broadcast and consensus, an electronic device and a storage medium. The system comprises a plurality of nodes, wherein the nodes may be co-served by a plurality of mutually trusted physical or virtual devices. The method comprises: data broadcast and data sequential consensus are decoupled, wherein the nodes jointly maintain a plurality of broadcast protocol instances and a Byzantine consensus protocol; broadcast protocols are responsible for transmitting data at a certain node to other nodes, the Byzantine consensus protocol is responsible for reaching a consensus on results of the plurality of broadcast protocol instances; and in the nodes, the plurality of broadcast protocol instances can be maintained by a plurality of devices in an one-to-one correspondence mode, and execution results of the broadcast protocols are transmitted to devices responsible for executing the Byzantine consensus protocol in the nodes. The present invention can be implemented to improve the efficiency of a blockchain system, and additionally, to more conveniently improve system efficiency by increasing physical resources.

5 Claims, 2 Drawing Sheets

(51) Int. Cl.

| | |
|---|---|
| *G06Q 20/38* | (2012.01) |
| *H04L 9/00* | (2022.01) |
| *H04L 9/06* | (2006.01) |
| *H04L 9/32* | (2006.01) |

(52) U.S. Cl.
CPC ........ *G06Q 20/3829* (2013.01); *H04L 9/3255* (2013.01); *H04L 9/50* (2022.05)

(56) References Cited

U.S. PATENT DOCUMENTS

| | | | | |
|---|---|---|---|---|
| 2020/0162264 | A1* | 5/2020 | Zamani | H04L 9/3297 |
| 2021/0297238 | A1 | 9/2021 | Guo | |
| 2023/0186293 | A1* | 6/2023 | Dolev | H04L 9/0869 705/75 |

FOREIGN PATENT DOCUMENTS

| | | | | |
|---|---|---|---|---|
| CN | 108985740 A | | 12/2018 | |
| CN | 110915166 A | | 3/2020 | |
| CN | 112463761 A | | 3/2021 | |
| CN | 112862490 A | * | 5/2021 | G06Q 20/3829 |
| CN | 113347007 A | | 9/2021 | |
| EP | 3786807 A1 | | 3/2021 | |
| WO | 2020/033048 A1 | | 2/2020 | |

OTHER PUBLICATIONS

"A Comprehensive Review of Blockchain Consensus Mechanisms"—Lashkari et al., University of Alberta University of Hradec Králové, IEEE Access, Oct. 2016 https://www.researchgate.net/publication/350031088_A_Comprehensive_Review_of_Blockchain_Consensus_Mechanisms (Year: 2016).*

* cited by examiner

ASYNCHRONOUS BLOCKCHAIN CONSENSUS METHOD AND SYSTEM WITH DECOUPLED DATA BROADCAST AND CONSENSUS, ELECTRONIC DEVICE AND STORAGE MEDIUM

TECHNICAL FIELD

The present invention belongs to the field of computer technology, particularly relates to an asynchronous blockchain consensus method and system with decoupled data broadcast and consensus, and electronic device and storage medium thereof.

BACKGROUND ARTS

Blockchain technology refers to a technical solution where all participants jointly maintain a distributed ledger through a consensus mechanism. Depending on different network model assumptions, it can be subdivided into synchronous, partial synchronous, and asynchronous models, with asynchronous being the weakest assumption. In the asynchronous network model assumption, neither participants nor designers can obtain an upper bound on network latency, making the design of asynchronous blockchain consensus more complex. In existing designs, most either directly achieve consensus on data or first distribute the data and then achieve consensus on the identity of the data sender. These designs are generally inefficient; the former is impractical due to poor data throughput and latency performance, while the latter, although somewhat improved, still suffers from significant confirmation delays and low transaction throughput. Therefore, a new asynchronous blockchain consensus mechanism is needed to break away from this design philosophy and improve the efficiency of asynchronous consensus mechanisms.

SUMMARY OF THE INVENTION

Given the technical problems existing in the current technology, the objective of this invention is to provide an asynchronous blockchain consensus mechanism that decouples data broadcasting from consensus. Specifically, this invention includes the following several important aspects:

1. An Asynchronous Blockchain Consensus Method with Decoupled Data Broadcast and Consensus This invention involves two types of parallel sub-protocols: a Data Broadcasting Protocol and a Data Ordering Consensus Protocol.

In the Data Broadcasting Protocol, assuming there are n participants in the consensus mechanism, all nodes jointly maintain kn sequentially executed instances of the Data Broadcasting Protocol (where k is a constant greater than 0, such as 1). Each node acts as a leader in k chains, responsible for forming sequential output data blocks from user or node data. In each instance of the Data Broadcasting Protocol, an independent reliable broadcast protocol is executed. The input to the protocol is a data block and its corresponding identifier. It is important to note that the specific implementation of the broadcast protocol in this invention is modular; different broadcast protocols can be used depending on the requirements. However, these broadcast protocols must meet the following conditions: 1) The protocol must output data blocks in sequence. 2) The output must include evidence of the broadcast protocol's completion. This evidence can, but is not limited to, using threshold-signatures. This evidence proves that the majority of participants received the same content. 3) The output must originate from the input of the broadcast protocol. 4) Adversaries must be unable to forge the evidence mentioned in condition 2. Under ideal conditions (such as a stable network, no node failures, and no adversaries), the outputs of the kn instances of the Data Broadcasting Protocol will grow sequentially and stably. Even under Byzantine adversaries or asynchronous network attacks, it can be ensured that at least kn-kt instances will grow sequentially and stably (where t is the number of Byzantine adversaries).

In the Data Ordering Consensus Protocol, all participating nodes jointly execute an asynchronous Multi-Valued Byzantine Agreement (MVBA) protocol sequentially. It is important to emphasize that the specific implementation of MVBA in this invention is modular; different MVBA protocols can be used depending on the requirements. However, these MVBA protocols must meet the following conditions: 1) Agreement: The outputs of any two honest nodes must be the same. 2) External Validity: There must exist a globally known assertion Q, such that for the output V of all honest nodes, Q(V)=true. 3) Termination: If the input of any honest node is valid, then eventually all honest nodes will output a value. 4) Quality: The output of the protocol has at least a greater than 50% probability of originating from an honest node. The input to the MVBA protocol consists of the length of the kn chains maintained by each node from its own view, the evidence of completion from the corresponding reliable data broadcasting protocol, and a unique identifier. There is an additional requirement for the input: the MVBA protocol considers an input valid only if, among the heights of the kn chains, there are at least z chains with heights greater than the previous MVBA protocol output ($n-2t \le z \le n-t$), where the leaders of these z chains are different, and all other heights are at least not less than the last consensus output. Note: The height mentioned in this specification refers to the number of sequential outputs from the Data Broadcasting Protocol. The output of the MVBA protocol is one of the valid inputs of the protocol. After the MVBA protocol output, nodes compare the most recent two outputs. The data blocks that are new in the latest output compared to the previous one are packaged into a confirmation block using a globally known deterministic algorithm. This confirmation block is then added to the locally maintained confirmation blockchain.

Throughout the entire protocol execution, kn parallel Data Broadcasting Protocols are executed, along with the sequential execution of the MVBA protocol. This method decouples data transmission from data ordering consensus, accomplished respectively by parallel reliable broadcast protocols and the MVBA protocol. Consequently, the inexpensive and efficient data broadcasting process is not blocked by the inefficient consensus process. Additionally, by adjusting the criteria for valid inputs to the consensus process, the number of consensus rounds can be further reduced. However, it is important to note that the aforementioned input validity criteria are the minimum requirements to ensure the safe execution of the protocol, and actual adjustments cannot lower these effective conditions.

2. An Asynchronous Blockchain Consensus System with Decoupled Data Broadcast and Consensus To improve the overall efficiency of the protocol, in addition to enhancing the protocol itself, physical resources can also be increased. There are two methods for increasing physical resources: Expanding resources on a single physical device, such as adding more memory. Adding new physical devices to collaborate on completing tasks. The consensus method of this invention can easily utilize the second method to improve overall protocol efficiency. Traditionally, one major issue with using the second method is how to divide tasks and communicate between sub-devices. These issues do not exist in our architecture. In the described consensus method, the kn instances of the broadcast protocol in the system are independent of each other. Participants can simply divide the work of the kn instances among kn sub-devices, with each sub-device maintaining one broadcast instance. Of course, one sub-device can also maintain multiple broadcast chains. Since the chains do not need to communicate with each other, the aforementioned issues do not arise. If all participants in the system have multiple devices, the k value can be increased to facilitate the division of tasks among these sub-devices. By this method, increasing physical resources can improve system execution efficiency. This allows large nodes, which control clusters of multiple physical devices, to more easily enhance the overall efficiency of the protocol.

In the described system, a single node can leave the execution of the protocol to multiple devices. Specifically, they can be categorized into three types of devices: tx_pool device, broadcaster device and order device. Among them, the tx_pool device is responsible for receiving and distributing transactions or data obtained from the client or other nodes; the broadcaster device is responsible for executing the data broadcast protocol and performing processing work related to inputs and outputs of the protocol; and the order device is responsible for executing the data sequential consensus protocol and performing processing work related to inputs and outputs of the protocol. Each of these devices may contain several devices that collaborate to perform functions.

Note: The devices referred to in this specification do not necessarily have to correspond to physically separate device entities if not specifically emphasized. That is, the devices may be implemented in software form, or in one or more hardware modules or integrated circuits, or in different networks and/or processor devices and/or microcontroller devices.

3. An Electronic Device Comprising:

Processor;

A memory for storing executable instructions of said processor;

Said processor for reading said executable instructions from said memory and executing said executable instructions to implement the said asynchronous blockchain consensus method with decoupled data broadcast and consensus.

4. A Computer-Readable Storage Medium

The storage medium stores computer program instructions that, when executed by a processor, are used to implement the said asynchronous blockchain consensus method with decoupled data broadcast and consensus.

The technical solution adopted in the present invention is as follows:

An asynchronous blockchain consensus method with decoupled data broadcast and consensus, applied to a blockchain system, said blockchain system containing a collection of consensus nodes, said method being executed by a consensus node in said consensus nodes, said method comprising the following steps:

Running a plurality of parallel data broadcast protocols between said nodes;

Executing a data sequential consensus protocol between said nodes based on the results of said data broadcast protocols using the height of the data block chain as input;

Maintaining a chain of confirmation blocks between said nodes based on the results of said data sequential consensus protocol, the contents of said chain of confirmation blocks being the final consensus results.

Preferably, said data sequential consensus protocol comprises sequentially executing an asynchronous multi-valued Byzantine consensus protocol, i.e., an MVBA protocol.

Preferably, said MVBA protocol is an asynchronous consensus protocol, and said MVBA protocol still operates properly under both synchronous and partial synchronous network assumptions, and the nature of said MVBA protocol are all guaranteed.

Preferably, said node, before executing said MVBA protocol, uses a customized method to determine if a data broadcast protocol has output a new block of data and satisfies a customized validity condition.

Preferably, said customized valid condition guarantees a minimum bound of system security: at least z data block chains with different nodes in leader roles have increased in height compared to the last consensus result, and the height of all data block chains is not less than the last consensus result, where $n-2t \leq z \leq n-t$, n is the total number of consensus participants, and t is the maximum number of adversaries tolerated by the system.

Preferably, a method of converting said consensus result of said MVBA protocol into a block on said chain of confirmation blocks is: when said node obtains said consensus result of said MVBA protocol, it compares it with the last consensus result, packs the data block that is more than the last consensus result into a confirmation block in accordance with a deterministic algorithm, and puts the confirmation block into the chain of confirmation blocks.

Preferably, each said node contains a number of order devices, kn broadcaster devices, and a number of tx_pool devices, the tx_pool devices being responsible for receiving and distributing transactions or data obtained from the client or other nodes, the broadcaster devices being responsible for executing the data broadcasting protocol and executing processing work related to inputs and outputs of the protocol work, the order device is responsible for executing the data sequential consensus protocol and performing processing work related to the input and output of that protocol; kn broadcaster devices correspond to kn data broadcast instances one by one, and each node has k broadcaster devices acting as leaders in the data broadcast protocol instances in which they participate; said tx_pool device distributes transactions or data to the k leader broadcasters; each said broadcaster device is responsible for maintaining one said data broadcasting protocol instance; said order device collects the results of the execution of said data broadcasting protocol instance by said broadcaster devices within the cluster and converts said results into blocks on said confirmation blockchain.

Preferably, under different network model assumptions or more complex assumptions of switching between different network models, said data broadcast protocol and data order consensus protocol are implemented by specific protocols under corresponding network model assumptions.

The asynchronous blockchain consensus system of the present invention employing the said method with decoupled data broadcast and consensus, comprising a blockchain system, said blockchain system containing a collection of consensus nodes, a plurality of parallel data broadcasting protocols running between nodes in said collection of consensus nodes; said nodes executing a data-sequential consensus protocol between nodes based on the results of said data broadcasting protocols using the height of the data blockchain as an input; said nodes maintaining a confirmation blockchain among said nodes based on the result of said data sequential consensus protocol, the content on said confirmation blockchain being the final consensus result.

The present invention also provides an electronic device comprising: a processor; and a memory for storing executable instructions of said processor; said processor, for reading said executable instructions from said memory and executing said executable instructions to implement said asynchronous blockchain consensus method of decoupling data broadcasting and consensus.

The present invention also provides a computer-readable storage medium storing computer program instructions which are executed by the processor to implement the above-described asynchronous blockchain consensus method of decoupling data broadcasting and consensus.

Compared with the existing technology, the beneficial effect of the present invention is that, without sacrificing security, the present invention improves the overall efficiency of the system by decoupling the data broadcast and the data sequential consensus in the blockchain protocol. At the same time, the present invention proposes an adaptation method based on a cluster architecture, so that the efficiency of the present invention can grow with the increase of physical resources.

BRIEF DESCRIPTION OF DRAWINGS

The accompanying drawings, which are incorporated herein and form a part of the specification, illustrate embodiments consistent with the present application and are used in conjunction with the specification to explain the principles of the present application. It will be apparent that the accompanying drawings in the following description are only some of the embodiments of the present application, and that other accompanying drawings may be obtained from these drawings by one of ordinary skill in the art without creative labor. In the accompanying drawings.

DETAILED DESCRIPTION OF THE INVENTION

Figure 1:
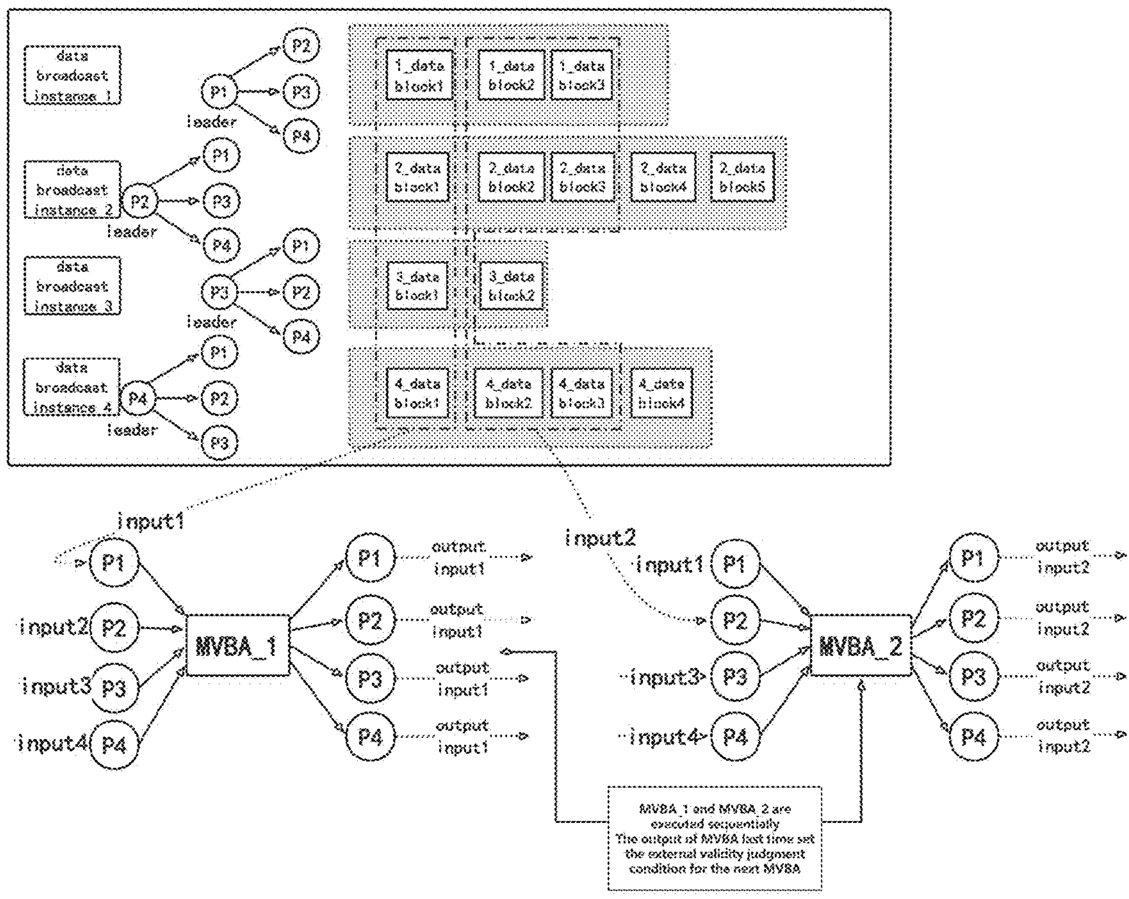
FIG. 1 is a flowchart of an asynchronous blockchain consensus flow for decoupling data broadcast and consensus when n=4 in embodiments.
Figure 2:
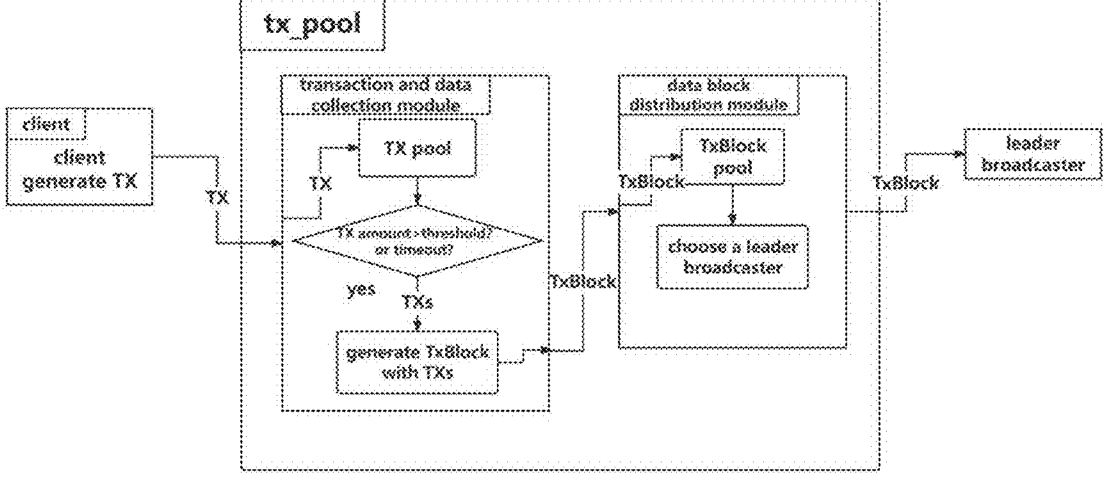
FIG. 2 is a schematic diagram of the structure of the tx_pool device in the embodiment.
Figure 3:
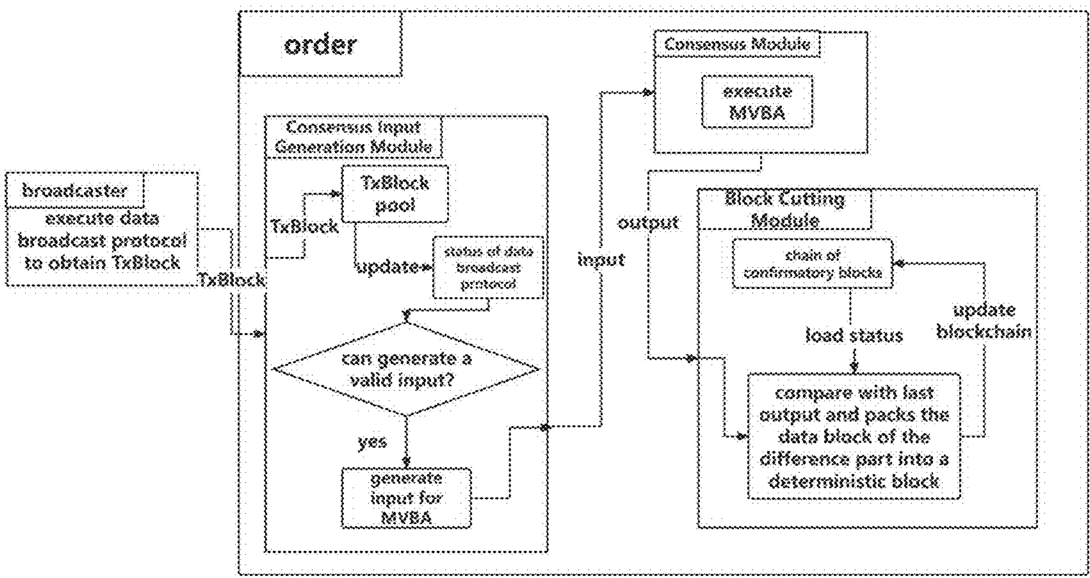
FIG. 3 is a schematic diagram of the structure of the order device in the embodiment.

The present invention is described in further detail below by means of specific embodiments and accompanying drawings.

The technical solution of the present invention is realized as follows:

1. The participants of the present scheme are n nodes $P_i (0 \leq i < n)$ that maintain the blockchain ledger, and a number of clients (the nodes may also play the role of clients) that present the original transactions or data. In each node's cluster, three devices are included, the first one is called order device (data sequential consensus protocol execution device), the second one is called broadcaster device (data broadcast protocol execution device), and the third one is called tx_pool device (data receiving and distributing device). Each node contains a number of order devices, kn broadcaster devices and a number of tx_pool devices. kn broadcaster devices correspond one-to-one with kn data broadcast instances, and each node has k broadcaster devices acting as leaders in the data broadcast protocol instances in which they participate.

2. execution process:

1) The client sends the original transaction or data to the tx_pool device of one or some nodes.

2) After receiving the transaction or data, the tx_pool device will randomly select a broadcaster device in its own cluster that assumes the role of leader in the instance of the data broadcast protocol it maintains, and forward the transaction or data to that device.

3) All the broadcaster devices acting in the leader role will pack the transactions or data into data blocks after collecting enough of them and use them as inputs to the data broadcast protocol, triggering the execution of the broadcast protocol. The non-leader broadcaster devices corresponding to other nodes assist the leader broadcaster device to jointly maintain a data chain. During the execution of the protocol, the broadcaster devices of all participants sequentially output a series of data blocks along with the corresponding evidence that most of the honest participants received the same data at a certain height of an instance of the data broadcast protocol.

4) All broadcaster devices, after getting the data blocks with valid evidence, forward them to the order devices in this cluster.

5) After the order device gets the data in 4), it updates the locally recorded state of the instance of the data broadcasting protocol in which this broadcaster device is located and detects whether the current global state satisfies the conditions for generating a valid input for MVBA. If it is satisfied, take it as input and execute MVBA; otherwise, continue to wait.

6) After the successful execution of MVBA, all order devices will get the output containing the input of a certain order device and the evidence of consensus completion.

7) After getting the MVBA output, all order devices will compare the output with the last MVBA output, and according to the comparison result, the corresponding broadcast data block obtained in 4) will be packaged as a confirmation data block by some public deterministic algorithm, and the confirmation data block will be put into the locally maintained confirmation blockchain.

It should be emphasized that broadcaster can start the next data broadcast as soon as it obtains enough transactions or data from the client upon completion of a broadcast, without waiting for the completion of MVBA.

IMPLEMENTATION EXAMPLE

The participants in this implementation are:

n nodes $P_i (0 \leq i < n)$ that maintain the blockchain ledger, and a number of clients that present the original transactions or data (the nodes can also play the role of clients). In the cluster of each node, three devices are included, namely the tx_pool device, the broadcaster device, and the order device.

The parameters that can be adjusted in this implementation are as follows:

(1) The number of participants n of the protocol;

(2) k in the number of globally maintained data broadcast chains kn;

(3) The determination condition of the external validity of the MVBA input.

The specific implementation of this embodiment is as follows:

1. Initialization process:

(1) All nodes use the same configuration of the adjustable parameters described above.

(2) All nodes use PKI to establish a secure channel with each other.

(3) Intra-node clustering is initialized by dividing a total of kn data broadcast protocol instances one-to-one to kn broadcaster devices, each of which is responsible for one of the instances.

(4) Inter-node exchange of cluster configuration tables, after which each broadcaster device establishes secure channels with the devices of other nodes in the broadcast data chain it maintains based on the configuration table.

2. The work of the tx_pool device in this embodiment: The normal operation of the tx_pool device is not affected by the other two devices. if more than one tx_pool device exists, there may be some interactions between the tx_pool devices to coordinate the outputs. the tx_pool device contains 2 main modules that are executed in parallel inside the tx_pool device:

(1) Transaction and Data Collection Module

This module is responsible for accepting transactions or data from clients and can initially verify the validity of these transactions or data. When the number of transactions or data reaches a certain amount, it will be packaged into data blocks and handed over to the data block distribution module.

(2) Data Block Distribution Module

This module is mainly responsible for distributing the data blocks to the broadcaster devices which assume the leader in the cluster. In this example, the distribution strategy adopts the polling method, but in practice, the distribution strategy can be modified according to the specific application environment, for example, for the environment that emphasizes on the efficiency, it can be distributed to the broadcaster devices that have a fast growth of the chain in priority.

3. The work of the order device in this embodiment:

The triggering of protocols within the order device depends on the output of the broadcaster device, but its execution process is parallel to the broadcaster device. The device contains three main modules inside the device that are executed in parallel:

(1) Consensus Input Generation Module

This module is mainly responsible for processing the data blocks from the broadcaster device and generating the inputs to the consensus module from them. Whenever a data block is received from the broadcaster, this module updates the locally maintained global state. And triggers the input generation function at the completion of each MVBA, if the global state at this time meets the preset input validity conditions, then the height of each data chain at this time and its proof along with the unique identifier generates the input for the next MVBA. And the input is passed to the consensus module.

(2) Consensus Module

The consensus module is responsible for executing the MVBA protocol. When this module receives an input message from the previous module, it calls MVBA with it as an input to the MVBA protocol, and then passes the output to the block-cutting module. This example does not give the specific MVBA protocol it used and its construction. In actual use, you can choose the appropriate MVBA protocol according to the specific application scenario. Note: The output of the protocol is one of the input value and its evidence of successful consensus.

(3) Block Cutting Module

This module is mainly responsible for updating and confirming the status of the blockchain according to the consensus result. After receiving the consensus result, the module compares the difference between the two most recent consensus results and packs the data block of the difference part into a deterministic block deterministically according to the polling order (e.g., the first consensus starts from the data block of the first broadcaster, and the second starts from the second broadcaster). This block is later added to the head of the locally maintained chain of confirmatory blocks.

4. The work of the leader broadcaster device in this embodiment:

The triggering of protocols within the leader broadcaster device relies on the output of the tx_pool device, but its execution process is parallel to that of the tx_pool device and operates independently of other broadcaster devices within the cluster. Acts as a leader in the data broadcast protocol instances it maintains. It is responsible for receiving data blocks distributed by the tx_pool devices in its cluster and adding unique identifiers to them. It is then used as input to invoke the reliable broadcast protocol, which ultimately obtains evidence of the completion of the corresponding broadcast. The evidence is then added to the data block and finally transmitted to the order device in the cluster.

5. The work of the non-leader broadcaster device in this embodiment:

The triggering of protocols within the non-leader broadcaster device is dependent on the output of the leader broadcaster device and operates independently of other broadcaster devices within the cluster, acting as a collaborator in the instance of the data broadcasting protocols it maintains. The non-leader broadcaster device constantly listens for messages from the leader broadcaster device in the data broadcast protocol instance in which it resides and responds according to the running broadcast protocol. Upon successful completion of the broadcast, the non-leader broadcaster device is eventually presented with a block of data and corresponding evidence of broadcast completion. The non-leader broadcaster device then transmits it to the order device in the cluster.

Embodiments of the present invention provide an asynchronous blockchain consensus system with decoupled data broadcast and consensus using a method of the present invention, comprising a blockchain system, said blockchain system containing a collection of consensus nodes, a plurality of parallel data broadcasting protocols running between nodes in said collection of consensus nodes; said nodes executing a data ordering consensus protocol between nodes based on the results of said data broadcasting protocols using the height of the data blockchain as inputs consensus protocol; said nodes maintaining a chain of confirmation blocks among said nodes based on the results of said data-sequential consensus protocol, the contents of said chain of confirmation blocks being the final consensus results.

It is to be understood that the terms “system” and “equipment” as used in this specification are used as a means of distinguishing between different components, elements, parts, sections or assemblies at different levels. However, if other words can accomplish the same purpose, the said words may be replaced by other expressions.

As shown in this specification and in the claims, unless the context clearly suggests an exception, the words “one,”

"a," "a kind of," and/or "The term "the" does not refer specifically to the singular, but may also include the plural. In general, the terms "including" and "comprising" suggest only the inclusion of clearly identified steps and elements, which do not constitute an exclusive list, and the method or apparatus may also include other steps or elements.

Flowcharts are used in this specification to illustrate the operations performed by a system according to embodiments of this specification. It should be understood that the preceding or following operations are not necessarily performed in an exact sequence. Instead, the steps may be processed in reverse order or simultaneously. It is also possible to add other operations to these processes or to remove a step or steps from these processes.

The basic concepts have been described above, and it will be apparent to those skilled in the art that the foregoing detailed disclosure is intended as an example only and does not constitute a limitation of the present specification. Although not expressly stated herein, those skilled in the art may make various modifications, improvements, and amendments to the present specification. Such modifications, improvements, and amendments are suggested in this specification, so such modifications, improvements, and amendments remain within the spirit and scope of the exemplary embodiments of this specification.

At the same time, the present specification uses specific terms to describe embodiments of the present specification. For example, "an embodiment", "an embodiment", and/or "some embodiments" are meant to refer to a particular feature, structure, or characteristic associated with at least one embodiment of the present specification. Accordingly, it should be emphasized and noted that "an embodiment" or "an embodiment" or "an alternative embodiment" mentioned two or more times at different places in the present specification do not necessarily refer to the same embodiment. does not necessarily refer to the same embodiment. Furthermore, certain features, structures, or characteristics in one or more embodiments of the present specification may be suitably combined.

In addition, it will be appreciated by those skilled in the art that aspects of the present specification may be illustrated and described by a number of patentable varieties or circumstances, including any new and useful combination of processes, machines, products, or substances, or any new and useful improvement thereof. Accordingly, aspects of this specification may be performed entirely by hardware, may be performed entirely by software (including firmware, resident software, microcode, etc.), or may be performed by a combination of hardware and software. Any of the above hardware or software may be referred to as a "block", "module", "engine", "unit", "component" or "system". In addition, aspects of the present specification may be manifested as a computer product in one or more computer-readable media, the product comprising computer-readable program code.

The computer storage medium may comprise a propagated data signal containing computer program code, for example on a baseband or as part of a carrier. The propagation signal may have a variety of manifestations, including electromagnetic forms, optical forms, etc., or suitable combinations thereof. The computer storage medium may be any computer-readable medium other than a computer-readable storage medium that may be used to communicate, propagate, or transmit a program for use by connecting to an instruction execution system, device, or apparatus. The program code located on the computer storage medium may be transmitted via any suitable medium, including radio, cable, fiber optic cable, RF, or similar medium, or any combination of the foregoing.

The computer program code required for the operation of the various portions of this specification may be written in any one or more programming languages, including object-oriented programming languages such as Java, Scala, Smalltalk, Eiffel, JADE, Emerald, C++, C#, VB.NET, Python, RUST, etc., conventional procedural programming languages such as C, Visual Basic, Fortran2003, Perl, COBOL2002, PHP, ABAP, dynamic programming languages such as Python, Ruby and Groovy, or other programming languages. The program code may run entirely on the user's computer, or as a stand-alone package on the user's computer, or partly on the user's computer and partly on a remote computer, or entirely on a remote computer or processing device. In the latter case, the remote computer may be connected to the user's computer through any form of network, such as a local area network (LAN) or a wide area network (WAN), or connected to an external computer (e.g., via the Internet), or in a cloud computing environment, or used as a service such as software as a service (Saas).

Furthermore, unless expressly stated in the claims, the order of processing elements and sequences, the use of numerical letters, or the use of other names described herein are not intended to limit the order of the processes and methods herein. Although a number of embodiments of the invention currently considered useful are discussed in the above disclosure by way of various examples, it should be understood that such details serve illustrative purposes only, and that additional claims are not limited to the disclosed embodiments; rather, the claims are intended to cover all amendments and equivalent combinations that are consistent with the substance and scope of the embodiments of the present specification. For example, while the system components described above may be realized by means of hardware devices, they may also be realized by means of software-only solutions, such as installing the described system on an existing processing or mobile device.

Similarly, it should be noted that in order to simplify the presentation of the disclosure of the present specification, and thus aid in the understanding of one or more embodiments of the invention, the preceding description of embodiments of the present specification sometimes incorporates a variety of features into a single embodiment, accompanying drawings, or description thereof. However, this method of disclosure does not imply that the objects of the present specification require more features than those mentioned in the claims. In fact, the embodiments have fewer features than all of the features of the single embodiment disclosed above.

Some embodiments use numbers describing the number of components, attributes, and it should be understood that such numbers used in the description of the embodiments are modified in some examples by the modifiers "approximately", "approximately", or "generally". "is used in some examples. Unless otherwise stated, "approximately", "approximately", or "generally" indicates that a variation of ±20% is permitted in the described numbers. Accordingly, in some embodiments, the numerical parameters used in both the specification and the claims are approximations, which can change depending on the desired characteristics of the individual embodiment. In some embodiments, the numerical parameters should take into account a specified number of valid digits and employ a general method of bit retention. Although the numerical domains and parameters used to confirm the breadth of their ranges in some embodiments of this specification are approximations, in specific embodiments such values are set as accurately as practicable.

With respect to each patent, patent application, patent application disclosure, and other material, such as articles, books, specifications, publications, documents, and the like, cited in this specification, the entire contents thereof are hereby incorporated herein by reference. Excluded are application history documents that are inconsistent with or create conflicts with the contents of this specification, as well as documents (currently or hereafter appended to this specification) that limit the broadest scope of the claims of this specification. It should be noted that in the event of any inconsistency or conflict between the descriptions, definitions, and/or use of terms in the materials appended to this specification and those described herein, the descriptions, definitions, and/or use of terms in this specification shall prevail.

Finally, it should be understood that the embodiments described in this specification are used only to illustrate the principles of the embodiments of this specification. Other variations may fall within the scope of this specification. Thus, by way of example and not limitation, alternative configurations of the embodiments of the present specification may be considered consistent with the teachings of the present specification. Accordingly, the embodiments of the present specification are not limited to the embodiments expressly presented and described herein.

The block diagrams shown in the accompanying figures are merely functional entities and do not necessarily have to correspond to physically separate entities. That is, the functional entities may be implemented in software form, or in one or more hardware modules or integrated circuits, or in different networks and/or processor devices and/or microcontroller devices.

The invention claimed is:

1. An asynchronous blockchain consensus method with decoupled data broadcast and consensus, applied to a blockchain system containing a set of consensus nodes, executed by the consensus nodes in the set, comprising:

running a plurality of parallel data broadcast protocols between said nodes;

executing a data sequential consensus protocol between said nodes based on the results of said data broadcast protocols using the height of the data block chain as input; wherein:

the data broadcast protocols are required to satisfy the following conditions:

1) The protocol sequentially outputs blocks of data;

2) The output is accompanied by evidence of completion of the broadcast protocol, which is constructed using a threshold signature, which proves that a majority of the participants have received the same;

3) The output is derived from the input from the broadcast protocol;

4) The adversary is unable to forge the evidence described in 2);

in the data-sequential consensus protocol, all the participating nodes work together to sequentially execute the asynchronous multi-valued Byzantine consensus protocol, i.e., the MVBA protocol, the specific implementation of the MVBA protocol is modular, and according to different needs, different MVBA protocols are used, but all these MVBA protocols need to satisfy the following conditions:

1) consistency;

2) external validity;

3) termination; and 4) quality;

maintaining a chain of confirmation blocks between said nodes based on the results of said data sequential consensus protocol, wherein the contents of said chain of confirmation blocks being the final consensus results;

wherein each said node comprises a plurality of order devices, kn broadcaster devices and a plurality of tx_pool devices, the tx_pool devices being responsible for receiving and distributing transactions or data obtained from the client or other nodes, and the broadcaster devices being responsible for executing the data broadcasting protocol and performing the processing related to the inputs and outputs of that protocol;

the order device is responsible for executing the data order consensus protocol and performing processing related to the inputs and outputs of that protocol;

the kn broadcaster devices correspond one-to-one with the kn data broadcast instances, and each node has k broadcaster devices acting as leaders in the data broadcast protocol instances in which they participate;

said tx_pool device distributes transactions or data to the k leader broadcasters;

each said broadcaster device is responsible for maintaining one of said data broadcast protocol instances;

said order device collects the results of the execution of said data broadcast protocol instances by said broadcaster devices within the cluster and converts said results into said confirmation block on the chain.

2. The method according to claim 1, wherein said nodes use a customized method to determine whether a data broadcast protocol has output a new block of data and satisfies a customized validity condition before executing said MVBA protocol.

3. The method according to claim 2, wherein said customized valid condition guarantees a minimum bound of system security:

at least z data block chains with different nodes in leader roles have increased in height compared to the last consensus result, and the height of all the data block chains is not less than the last consensus result, wherein $n-2t \leq z \leq n-t$, n is the total number of consensus participants, and t is the system tolerates a maximum number of adversaries.

4. The method according to claim 1, wherein the method includes converting said consensus result of said MVBA protocol into a block on said confirmation blockchain:

when said node obtains said consensus result of said MVBA protocol, it compares it with the last consensus result, packs the data block which is more than the last consensus result into a confirmation block in accordance with a deterministic algorithm, and puts the confirmation block placed into a chain of confirmation blocks.

5. The method according to claim 1, wherein under different network model assumptions or more complex assumptions of switching between different network models, said data broadcast protocol and data order consensus protocol are implemented by specific protocols under corresponding network model assumptions.

* * * * *